US012699572B2

(12) United States Patent
Levy et al.

(10) Patent No.: US 12,699,572 B2
(45) Date of Patent: Aug. 4, 2026

(54) FLEXIBLE HARDWARE COMPONENT DRIVER LOADING

(71) Applicant: MELLANOX TECHNOLOGIES, LTD., Yokneam (IL)

(72) Inventors: Ofer Levy, Kiryat Ono (IL); Nir Einati, Kfar Saba (IL); Michael Shych, Modiin (IL); Vadim Pasternak, Modiin (IL); Layal Arkab, Osfya (IL); Keren Younger Hadad, Rishon le Zion (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 80 days.

(21) Appl. No.: 18/242,269

(22) Filed: Sep. 5, 2023

(65) Prior Publication Data

US 2025/0077236 A1      Mar. 6, 2025

(51) Int. Cl.
*G06F 9/4401* (2018.01)

(52) U.S. Cl.
CPC ............ *G06F 9/4411* (2013.01); *G06F 9/441* (2013.01)

(58) Field of Classification Search
CPC ................................ G06F 9/4411; G06F 9/441
See application file for complete search history.

(56) References Cited

U.S. PATENT DOCUMENTS

| | | | | | | |
|---|---|---|---|---|---|---|
| 5,432,941 | A | * | 7/1995 | Crick | .................. | G06F 9/44505 713/1 |
| 7,266,818 | B2 | * | 9/2007 | Pike | ................... | G06F 9/44505 717/176 |
| 8,554,957 | B1 | * | 10/2013 | Wieland | .................. | G06F 13/36 719/321 |
| 11,113,070 | B1 | * | 9/2021 | Kulchytskyy | ....... | G06F 9/44505 |
| 11,321,203 | B1 | * | 5/2022 | Straw | .................. | G06F 11/3089 |
| 12,229,241 | B2 | * | 2/2025 | Young | ..................... | G06F 21/44 |
| 2003/0056090 | A1 | * | 3/2003 | Khanna | .................. | G06F 9/4411 713/1 |
| 2004/0003135 | A1 | * | 1/2004 | Moore | .................. | G06F 9/4411 719/321 |
| 2004/0193860 | A1 | * | 9/2004 | Rothman | .............. | G06F 9/4411 713/1 |
| 2004/0199758 | A1 | * | 10/2004 | Meaney | ................ | G06F 9/4416 713/2 |
| 2012/0054740 | A1 | * | 3/2012 | Chakraborty | ....... | G06F 9/45558 718/1 |
| 2016/0103771 | A1 | * | 4/2016 | Bhesania | .............. | G06F 9/4411 710/10 |
| 2018/0357070 | A1 | * | 12/2018 | Warkentin | ............ | G06F 9/4406 |
| 2019/0227954 | A1 | * | 7/2019 | Shi | ......................... | G06F 13/102 |

(Continued)

OTHER PUBLICATIONS

BIOS. What it is, and all you need to know (Year: 2009).*

*Primary Examiner* — Aurel Prifti

(74) *Attorney, Agent, or Firm* — Sheridan Ross P.C.

(57) ABSTRACT

System, methods, and devices for initializing a system by loading drivers are provided. In one example, a system includes comprising one or more circuits to initiate a system initiation or a boot of the system, during the system initiation or the boot of the system, read data from a non-volatile memory, based on the data from the non-volatile memory, identify a plurality of hardware components, identify one or more drivers based on the plurality of hardware components, and load the one or more drivers during the system initiation or the boot of the system.

20 Claims, 5 Drawing Sheets

(56)          References Cited

U.S. PATENT DOCUMENTS

| | | | |
|---|---|---|---|
| 2019/0278636 A1* | 9/2019 | Dabak | G06F 9/44594 |
| 2020/0204436 A1* | 6/2020 | Brown | G07F 17/3262 |
| 2021/0026647 A1* | 1/2021 | Warkentin | G06F 9/4401 |
| 2021/0165661 A1* | 6/2021 | Castillo | G06F 9/4411 |
| 2021/0240491 A1* | 8/2021 | Downum | G06F 9/4406 |
| 2021/0255876 A1* | 8/2021 | Puhan | G06F 9/4411 |
| 2021/0286692 A1* | 9/2021 | Chien | G06F 11/2284 |
| 2022/0114068 A1* | 4/2022 | Straw | G06F 11/3058 |
| 2022/0207186 A1* | 6/2022 | Young | G06F 21/64 |
| 2022/0345378 A1* | 10/2022 | Guyan | G09G 3/3453 |
| 2024/0134655 A1* | 4/2024 | Casella | G06F 9/4401 |

* cited by examiner

FLEXIBLE HARDWARE COMPONENT DRIVER LOADING

FIELD OF THE DISCLOSURE

The present disclosure is generally directed toward computing systems and, in particular, toward a flexible system for the loading of drivers for hardware components in a computing system during boot of a computing system.

BACKGROUND

When designing a computing system, hardware components are selected, laid out, and routed on one or more printed circuit boards (referred to herein as "PCBs" or "boards"). Next, the board(s) for the system are manufactured and the hardware components are acquired and soldered or otherwise mounted to the board(s).

Hardware changes rapidly due to supply chain and availability issues, which means manufacturers are often required to replace many hardware elements and components selected by the hardware designers during the design phase. While the hardware designers, during the design phase, may select specific hardware components, such as a particular voltage regulator, the actual hardware components which are acquired and mounted to the board(s) may vary from the specific hardware components selected by the hardware designers. This creates issues which arise during the boot sequence. As much as two different hardware components, such as two types of voltage regulators, may be compatible in the system from the electrical point of view, the components may not necessarily require the same software driver or interface.

SUMMARY

Conventional mechanisms for enabling software of a computing system to adapt to changed components rely on only a few changed hardware components being installed in the system. Such conventional mechanisms use hardware indicators, such as resistors or switches installed on a board of the system, which can be detected by the system to recognize changed hardware components. For example, a board manufacturer may place a few different resistors on a board to indicate the hardware revision being used. On a binary level, having between two and four resistors on a board enables board manufacturers to select between up to sixteen different configurations of hardware. Such a conventional mechanism may be appropriate for systems in which very few components may be replaced. Modern computing systems may include any number of possible hardware components being replaced. Using conventional mechanisms to indicate a vast number of hardware components being replaced would require an excessive number of hardware indicators, such as resistors, being installed on a board, resulting in boards of unnecessary excessive size and cost. Moreover, each possible configuration must be stored in a table in memory so that the software of the system can decode the meaning of the hardware indicators.

Embodiments of the present disclosure aim to provide a technological solution to the above-discussed issues with the conventional mechanisms for enabling software to adapt to hardware component changes is provided. As described herein, hardware components installed on one or more boards of a system may be identified during the production stage. A string (or data in another format) may be generated which identifies the hardware components installed on the board or boards within the system. Next, the string may be burned inside a system management basic input/output (SMBIOS) field which the software of the system may read during a boot sequence. Using a system as describe wherein enables the software of the computing system to identify the hardware components installed on the board or boards of the system. After determining the hardware components installed in the system, the software may be enabled to identify which driver or drivers is required for each specific component.

Illustratively, and without limitation, a computing device or system is disclosed herein to include one or more circuits to: initiate a system initiation or a boot of the system; during the system initiation or the boot of the system, read data from a non-volatile memory; based on the data from the non-volatile memory, identify a plurality of hardware components; identify one or more drivers based on the plurality of hardware components; and load the one or more drivers during the system initiation or the boot of the system. In some embodiments, the data is a string, while in some embodiments the data is a file. In some embodiments, the data is stored in an SMBIOS field.

In some embodiments, the non-volatile memory is an electrically erasable programmable read-only memory (EE-PROM) device. In some embodiments, the data is written to the non-volatile memory prior to the system initiation or the boot of the system. In some embodiments, the data is written to the non-volatile memory during production of the system. In some embodiments, reading the data and identifying the one or more drivers is performed by a software application during the system initiation or the boot of the system. In some embodiments, identifying the one or more drivers comprises selecting the one or more drivers from a memory storage device, wherein the one or more drivers are kernel drivers. In some embodiments, the one or more circuits are further to determine, based on the data, a printed circuit board (PCB) from among a plurality of PCBs on which each hardware component of the plurality of hardware components is mounted. In some embodiments, each of the plurality of PCBs comprise one of an application-specific integrated circuit (ASIC) board, a central processing unit (CPU) board, a clock board, a fan board, a platform board, a power board, and a switch board. In some embodiments, the plurality of hardware components comprises one or more of a thermal sensor, temperature sensor, voltage sensor, a voltage regulator, a memory storage device, an input/output device, a timer, and a fan. In some embodiments, the hardware components of the plurality of hardware components are not hot-pluggable. In some embodiments, the data comprises one or more characters indicating hardware components not installed in the system. In some embodiments, identifying the plurality of hardware components comprises comparing characters in the data to entries of a lookup table.

In another example, a switch system is described that includes one or more circuits to: initiate a system initiation or a boot of the switch system; during the system initiation or the boot of the switch system, read data from a non-volatile memory; based on the data from the non-volatile memory, identify a plurality of hardware components; identify one or more drivers based on the plurality of hardware components; and load the one or more drivers during the system initiation or boot of the switch system. In some embodiments, the data is a string, while in some embodiments the data is a file. In some embodiments, the data is stored in a system management basic input/output (SMBIOS) field. In some embodiments, the non-volatile memory is an electrically erasable programmable read-only memory (EEPROM) device. In some embodiments, the data is written to the non-volatile memory prior to the system initiation or the boot of the system. In some embodiments, the data is written to the non-volatile memory during production of the system. In some embodiments, reading the data and identifying the one or more drivers is performed by a software application during the system initiation or the boot of the system. In some embodiments, identifying the one or more drivers comprises selecting the one or more drivers from a memory storage device, wherein the one or more drivers are kernel drivers. In some embodiments, the one or more circuits are further to determine, based on the data, a printed circuit board (PCB) from among a plurality of PCBs on which each hardware component of the plurality of hardware components is mounted. In some embodiments, each of the plurality of PCBs comprise one of an application-specific integrated circuit (ASIC) board, a central processing unit (CPU) board, a clock board, a fan board, a platform board, a power board, and a switch board. In some embodiments, the plurality of hardware components comprises one or more of a thermal sensor, temperature sensor, voltage sensor, a voltage regulator, a memory storage device, an input/output device, a timer, and a fan. In some embodiments, the hardware components of the plurality of hardware components are not hot-pluggable. In some embodiments, the data comprises one or more characters indicating hardware components not installed in the system. In some embodiments, identifying the plurality of hardware components comprises comparing characters in the data to entries of a lookup table.

In another example, a method of initializing a system is disclosed that includes: initiating a system initiation or a boot of the system; reading data from a non-volatile memory; based on the data from the non-volatile memory, identifying a plurality of hardware components; identifying one or more drivers based on the plurality of hardware components; and loading the one or more drivers during the system initiation or the boot of the system.

Additional features and advantages are described herein and will be apparent from the following Description and the figures.

BRIEF DESCRIPTION OF THE DRAWINGS

The present disclosure is described in conjunction with the appended figures, which are not necessarily drawn to scale.

DETAILED DESCRIPTION

Figure 1:
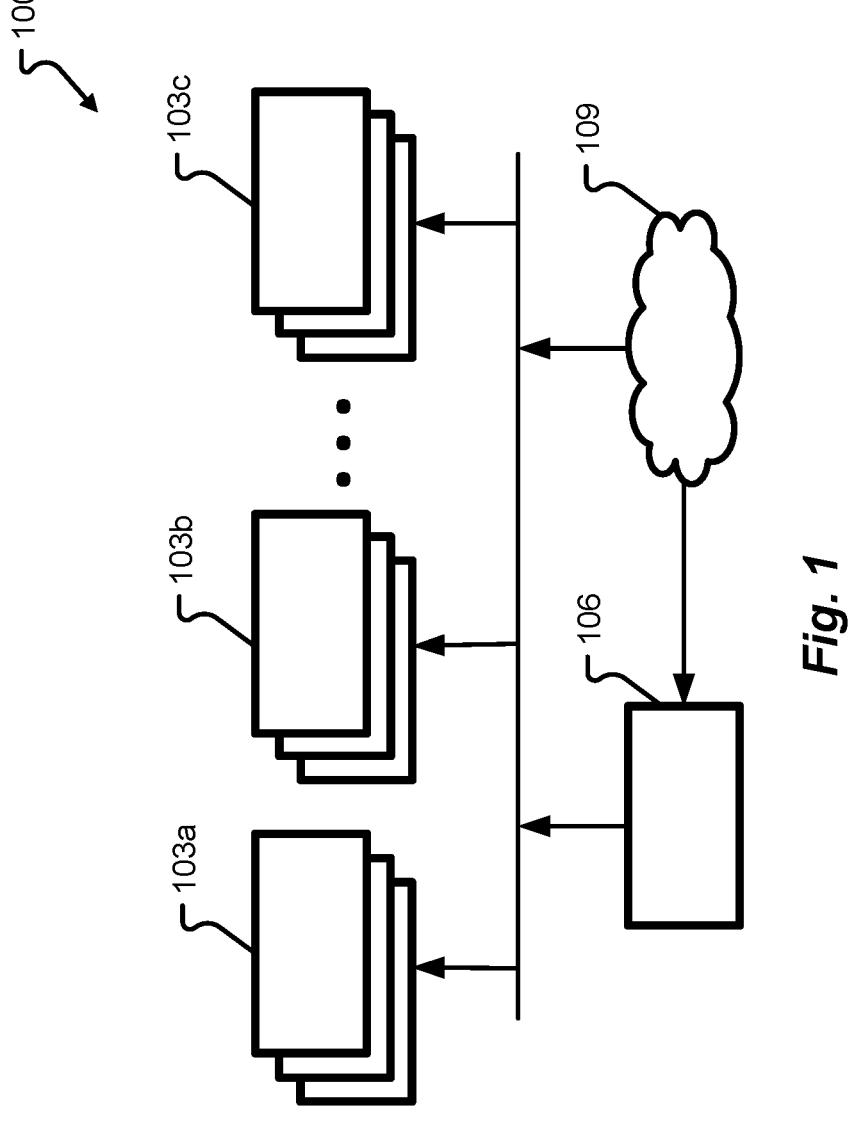
FIG. 1 is a block diagram illustrating a computing system production environment in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-6, various systems, and methods for creating hardware information and loading drivers will be described in accordance with at least some embodiments of the present disclosure. As will be described in more detail herein, computing systems may be enabled to automatically load drivers based on hardware information associated with hardware components installed within the respective system. By including hardware information in non-volatile memory of such computing systems, a boot loading application may be enabled to identify the hardware components installed within the system and load the associated drivers. The systems and methods of loading drivers as described herein enable hardware component changes to be made during production without resulting in time delays or increased costs.

Systems and methods as described herein enable flexibility and customization possibilities during the production stage. While conventional methods of enabling hardware component modifications involving software may be available, such conventional methods require building a board description during the build-time. Such methods require several tables and many software versions, resulting in greater complexity, more memory requirements. Using a system as described herein, on the other hand, customizations may be performed without involving changes to the software.

Using a system as described herein, manufacturers are enabled to swap hardware components without updating the system software. Instead, hardware components may be changed in the production line, a string as described herein may be created, and the software of the system will install the necessary drivers and make other configuration changes based on the string. Using a constructed string as described herein, a computing system including multiple boards may be set up with any number of hardware component changes.

Referring initially to FIG. 1, an illustrative environment is shown in which a computing system 106 may be responsible for directing and/or managing the production of systems 103a-c. The computing system 106 may be designed and configured to control various aspects of the production process, including the selection and/or installation of specific hardware components in each of the systems 103a-c. While described as different types of devices, it should be appreciated that the computing system 106 and systems 103a-c may be of the same or similar type of device. For instance, the systems 103a-c, 106 may both correspond to or include network devices such as switches for routing packets between machines connected to the communication network. Alternatively, the systems 103a-c, 106 may correspond to or include computing devices that include one or more applications.

While only a single computing system 106 is depicted, it should be appreciated that the environment 100 may include multiple computing systems 106. Likewise, the number of systems 103a-c may be greater or fewer than the number of systems 103a-c illustrated.

The systems 103a-c may include any type of device used to facilitate machine-to-machine communications. The systems 103a-c may include one or more of a switch, a server, a Network Interface Controller (NIC), a network adapter, an Ethernet card, an expansion card, a Local Area Network (LAN) adapter, a physical network interface, a wireless router, a network border device, or the like. Alternatively or additionally, the systems 103a-c may be referred to as a data transfer device.

In some implementations, the computing system 106 may be configured to determine an identity of hardware components in each of the systems 103a-c and to generate a string or data file, as described in greater detail below.

For instance, when producing a system 103a, such as a switch, the computing system 106 might determine the type and specifications of components such as memory modules, power supply units, network interfaces, temperature sensors, fan controllers, and other hardware components. The computing system 106 may also identify a printed circuit board (PCB) on which each component is installed. For example, the computing system 106 may determine a first system 103a has a fan PCB on which a particular temperature sensor and a particular fan controller is installed and a power supply PCB on which a particular power supply unit is installed.

Furthermore, the computing system 106 may be capable of generating a data file or string as described herein based on the determined hardware components and/or PCBs for each system 103a-c. The computing system 106 may then write the data file or string to non-volatile memory of each respective system 103a-c.

Through this approach, the overseeing computer system can ensure that each produced system 103a-c is capable, through the use of systems and methods described herein, to identify the hardware components and load the necessary drivers based on the hardware components. Using a system as described herein, component changes during production may be made without slowing the production of systems 103a-c or incurring additional cost.

In some implementations, the computing system 106 may receive instructions from other devices, such as via a network 109 such as the Internet. For example, remote devices may control the selection and installation of components within the systems 103a-c. Such remote devices may instruct the computing system 106 as to which hardware components are installed within each particular system 103a-c.

Each of the systems 103a-c may be computer devices, such as switches, and may comprise different hardware components and/or different PCBs.

For example, the systems 103a-c may be any type of computing system comprising one or more PCBs, such as motherboards, on which hardware components are installed. Each of the systems 103a-c may effectively be the same product, but may include slight variances in the types of hardware components being used. For example, due to product shortages or cost reasons, a particular hardware component, such as a fan controller which requires a particular driver may be used in a first system 103a but may be swapped for a different fan controller requiring a different driver in a second system 103b. As a result, despite overall similarities between the two systems 103a-b, the drivers required for booting differ.

Figure 2:
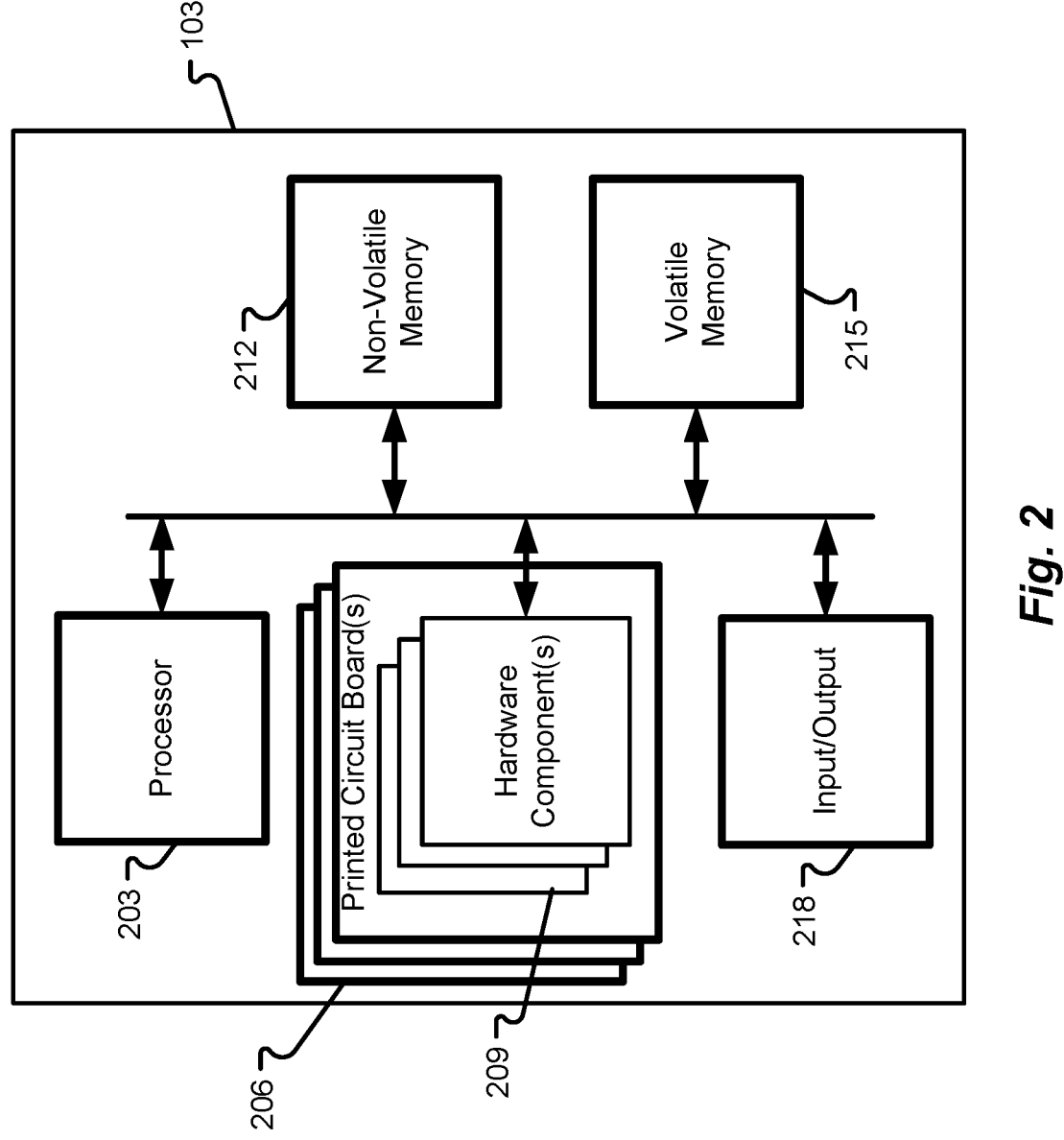
FIG. 2 is a block diagram illustrating a computing system in accordance with at least some embodiments of the present disclosure.

As illustrated in FIG. 2, a system 103, such as a switch, may be a computing system comprising a number of components.

In some implementations, a system 103 may take the form of a network switch or a similar data handling device. Such a system 103 may incorporate various components which collectively enable its functioning and performance.

The system 103 may include one or more processors 203 which may function as a central processing unit (CPU) and may coordinate and execute various operations, instructions, and tasks within the system 103. The processor 203 may interact with other components of the system 103 and control their functions such as, in the case of a switch, to provide data handling.

In some embodiments, the system 103 is provided with a processing unit configured to perform data processing functions within the system 103. As an example, the system 103 may include a processor 203 in the form of a Central Processing Unit (CPU), Graphics Processing Unit (GPU), or Data Processing Unit (DPU), which may enable the system 103 to perform boot loading processes, etc.

The system 103 may also include one or more input/output (I/O) circuitry or devices 218. I/O circuitry 218 may be used by the processor 203 to manage data exchange between the system 103 and external entities. This could involve receiving incoming data packets, sending outgoing packets, interfacing with other hardware components, or communicating with other network nodes. The I/O circuitry 218 could include network ports, connectors, signal converters, or any other relevant devices or interfaces. The I/O circuitry 218 may be used, for example, by a computing system 106 as illustrated in FIG. 1 to write data to the non-volatile memory 212 of the system 103.

The system 103 and computing system 106 may each be connected to a communication network 109 such as via I/O circuitry 218. The I/O circuitry 218 may enable communications between the system 103 and the communication network 109 via a communication link. The communication link may include a wired connection, a wireless connection, an electrical connection, etc. In some embodiments, the communication link may facilitate the transmission of data packets, such as hardware information as described herein, between the system 103 and the computing system 106 via one or more of electrical signals, optical signals, combinations thereof, and the like. It should be appreciated that the communication link may include, without limitation, a PCIe link, a Compute Express Link (CXL) link, a high-speed direct GPU-to-GPU link (e.g., an NVlink), etc.

The system 103 may correspond to any suitable type of device used for receiving and processing data. Non-limiting examples of a system 103 include a Personal Computer (PC), a smartphone, a host device, a switch, a server, a NIC, a network adapter, an Ethernet card, an expansion card, a LAN adapter, a physical network interface, a wireless router, a network border device, or the like.

As noted above, the system 103 may include a processor 203 that is coupled with other elements of the system 103. Components that may be included as part of the processor 203 include, without limitation, a processor/controller, memory, a local oscillator, and/or one or more other circuits.

The system 103 may further include two types of memory: non-volatile memory 212 and volatile memory 215. The non-volatile memory 212 may be configured to retain data when the system 103 is powered off. Non-volatile memory 212 may store firmware, system configurations, or other persistent data, as described in greater detail below. Volatile memory 215 of the system 103 may be used to temporarily store data that is actively being processed or transferred, such as packet data, buffer contents, or operational logs.

The memory 212, 215 may include instructions for execution by the processor 203 that, when executed by the processor 203, enable the processor 203 to perform any number of tasks (e.g., system booting, driver loading, etc.). In some embodiments, the memory 212, 215 may include one or more applications executable by the processor 203.

As described herein, the system 103 includes one or more hardware components 209, such as thermal sensors, voltage controllers, power supply elements, switch ICs, ASICs, clock ICs, and/or other hardware components which may require the use of one or more drivers. Such hardware components 209 could perform various monitoring, control, or auxiliary functions within the system 103. For instance, thermal sensors might monitor thermal conditions within the system 103, while voltage controllers could regulate power supply to components within the system 103.

Each of the hardware components may be mounted onto one or more PCBs 206 of the system 103. Each of the one or more PCBs may be of a particular type of board, such as a CPU/Comex board, switch/ASIC board, a power board, a fan board, a platform board, a clock board, etc. In some implementations, the system 103 may include multiple of the same types of boards, such as two fan boards, three switch boards, etc.

One or more circuits may be provided as part of the processor 203 or may be specifically configured to perform a function of the processor 203 without necessarily referencing instructions in memory 212, 215. For instance, the circuit(s) may include digital circuit components, analog circuit components, active circuit components, passive circuit components, or the like that are specifically configured to perform a particular data truncation operation and/or transmission process. The circuit(s) may alternatively or additionally include switching hardware that is configurable to selectively interconnect one device interface with another device interface (e.g., where the system 103 includes a switch or a component of a switch). Accordingly, the circuit(s) may include electrical and/or optical components without departing from the scope of the present disclosure.

The processor 203 and/or circuit(s) may include one or more integrated circuit (IC) chips, microprocessors, circuit boards, simple analog circuit components (e.g., resistors, capacitors, inductors, etc.), digital circuit components (e.g., transistors, logic gates, etc.), registers, field programmable gate arrays (FPGAs), application specific integrated circuits (ASICs), combinations thereof, and the like. It should be appreciated that circuit(s) may provide sufficient functionality to support operations of the processor 203 described herein. As noted above, the processor 203 may correspond to a CPU, GPU, DPU, combinations thereof, and the like. Thus, while only a single processor 203 is shown in the system 103, it should be appreciated that the system 103 may include multiple processors 203 without departing from the scope of the present disclosure.

The memory 212, 215 may include any number of types of memory devices. As an example, the memory 136 may include Random Access Memory (RAM), Read Only Memory (ROM), flash memory, Electronically-Erasable Programmable ROM (EEPROM), Dynamic RAM (DRAM), buffer memory, combinations thereof, and the like.

Figure 3:
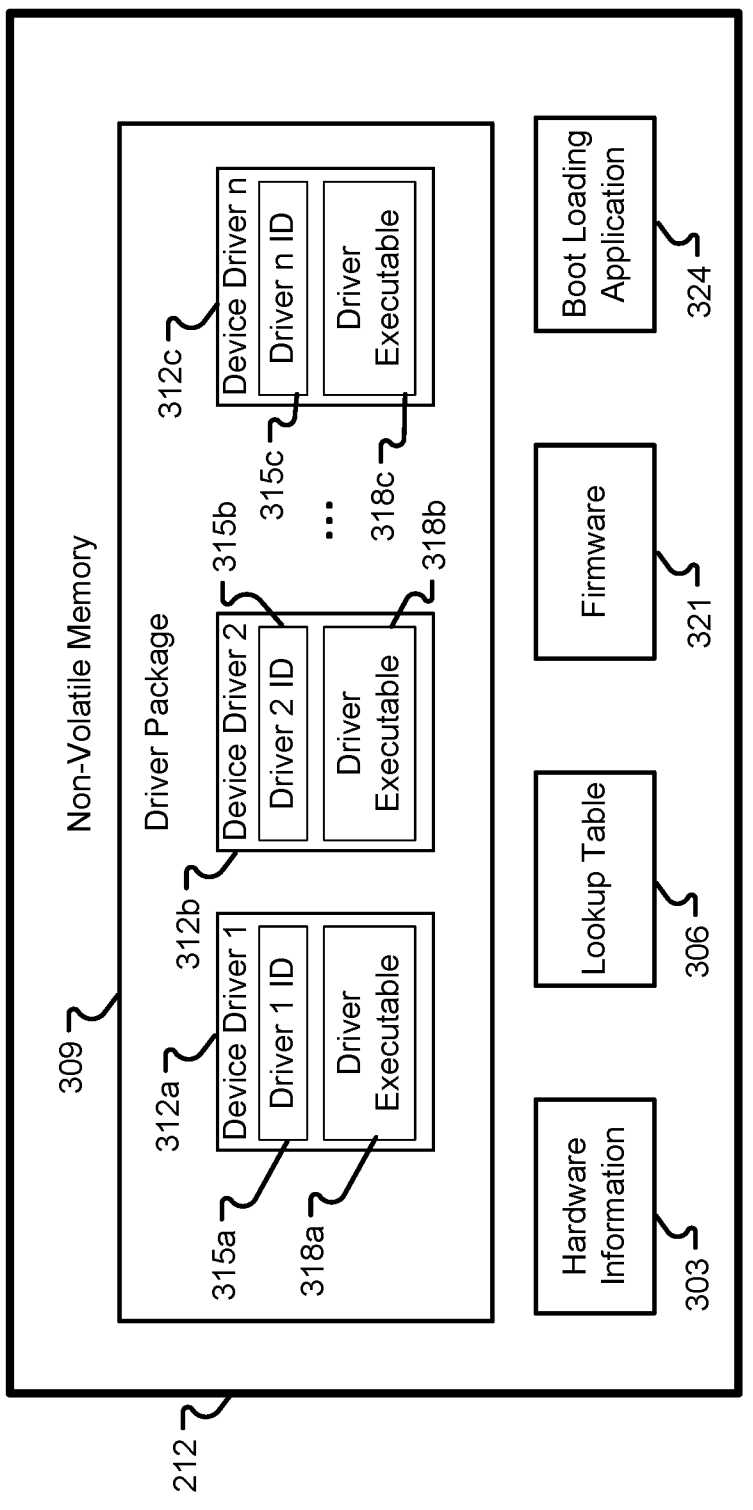
FIG. 3 is a block diagram illustrating non-volatile memory of a computing system in accordance with at least some embodiments of the present disclosure.

As illustrated in FIG. 3, non-volatile memory 212 of a system 103 may store a number of files and software applications. In particular, the non-volatile memory 212 may store one or more device drivers 312a-c. For example, the non-volatile memory 212 may store one or more driver packages 309, each of which may comprise data associated with drivers for hardware components 209

Each device driver 312a-c may be associated with a particular one or more hardware components 209. For example, a particular voltage regulator may require a first device driver 312a and a different voltage regulator may require a second device driver 312b.

In some implementations, each driver 312a-c may include a device identification (ID) indicating a device 315a-c or an ID, such as a filename, indicating the driver itself. Each driver 312a-c may also include a driver executable 318a-c.

The driver package 309 may include driver information for all potential drivers which may be installed in a system 103a-c during production. In some cases, one or more of the device drivers 312a-c may not be needed and may not be loaded during boot as described below.

Storing drivers 312a-c in non-volatile memory 212 ensures the persistent availability of the drivers 312a-c to the system 103, even across power cycles or restarts. This allows the system 103 to initialize and operate the hardware components effectively from boot up.

The driver package 309 may be a data file written to each system 103a-c during production. The contents of the driver package 309 may be the same for a number of different systems 103a-c. For example, as the particular hardware components 209 and/or PCBs 206 installed within each system 103a-c change during production, the driver package 309 may simply be written to each without regard for changes in the selection of hardware components 209. The driver package 309 may store the drivers 312a-c needed for all hardware components installed across all systems 103a-c, whether or not the drivers 312a-c are needed for hardware components 209 of the particular system 103 in which the package 309 is installed.

A boot loading application 324 may also be stored in the non-volatile memory 212 of the system 103. The boot loading application 324 may be executed, for example, by a processor 203 of the system 103. The boot loading application 324 may be capable of comparing hardware information 303 with a lookup table 306 to select one or more of the device drivers 312a-c to load during a boot of the system 103 through a process as described in greater detail below.

A lookup table 306 may be stored in the non-volatile memory 212 and may store sufficient information such that the boot loading application 324 may be capable of comparing the hardware information 303, as described below, with the lookup table 306 and selecting one or more device drivers 315a-c to load during the boot.

Similar to the driver package 309, the lookup table 306 may be written to all systems 103a-c during production and may contain sufficient information such that no matter which hardware component 209 is installed in the system 103, the boot loading application 324 may be capable of identifying the drivers 312a-c which should be loaded based on the hardware information 303.

The lookup table 306 may comprise a table listing any hardware components 209 which may potentially be installed within the system 103. For each component 209, one or more drivers 312a-c which may be necessary for operation of the component 209 may also be listed. The hardware components 209 may be listed in the lookup table 306 by, for example, a Reference Designator (RefDes).

Each entry in the lookup table 306 may correspond to a hardware component 209 within the system 103 and may contain identifying information for that component 209, such as a RefDes) of the component 209. A RefDes may be a code or label that uniquely identifies each component. Each RefDes may be a prefix denoting the type of component (for example, "R" for resistors, "C" for capacitors, "Q" for transistors, "U" for integrated circuits), followed by a unique numerical identifier. The unique numerical identifier may differ between different types and/or manufacturers for each component type.

The lookup table 306 may also indicate which driver or drivers 312a-c are used to operate the respective hardware component 209. This could be represented as a driver ID 315a, a file path to the driver 312a-c within the non-volatile memory 212, or another unique identifier for the driver 312a-c.

The non-volatile memory 212 may also store firmware 321 such as a BIOS or a UEFI. The type of non-volatile memory used for storing firmware can vary but might commonly include electrically erasable programmable read-only memory (EEPROM), flash memory, or other forms of persistent storage.

This firmware 321 stored in the non-volatile memory 212 may in some implementations be either a Unified Extensible Firmware Interface (UEFI) or a Basic Input/Output System (BIOS), either of which may serve as an intermediary between the hardware components 209 and an operating system of the system 103 during boot-up.

In the case of BIOS, the firmware 321 may perform a power-on self-test (POST) to ensure all the hardware components are functioning correctly upon system startup. Following this, the firmware 321 may load the boot loading application 324, which then initiates the loading of the drivers 312a-c as described herein.

In the case of UEFI, the firmware 321 may perform similar hardware checks and may identify an EFI System Partition on a boot device, which may contain the boot loading application 324.

As described above, during production of the systems 103a-c, a computing system 106 may determine which hardware components are installed within each particular system 103a-c and may generate hardware information 303 and write the hardware information 303 to the non-volatile memory 212 of each system 103a-c. The hardware information 303 may include a list of each hardware component, such as indicated by a RefDes, and an indication as to on which PCB the component is installed. In some implementations, the hardware information 303 may also indicate components which are not on the system 103.

The hardware information 303 may be in the form of a data file or a string and may be accessible during boot of the system 103, such as by the firmware 321 and/or the boot loading application 324.

Using the hardware information 303, the boot loading application 324 may be capable of determining which driver or drivers 312a-c should be loaded. Using the systems and methods described herein, users of a system 103, such as a switch, may be enabled to power on the system 103 for the first time and be ensured that the proper device drivers 312a-c are installed based on the exact hardware components 209 used within the system. Similarly, manufacturers of the system 103 can easily produce variations based on availability of hardware components without slowing down production or incurring additional costs.

Figure 4:
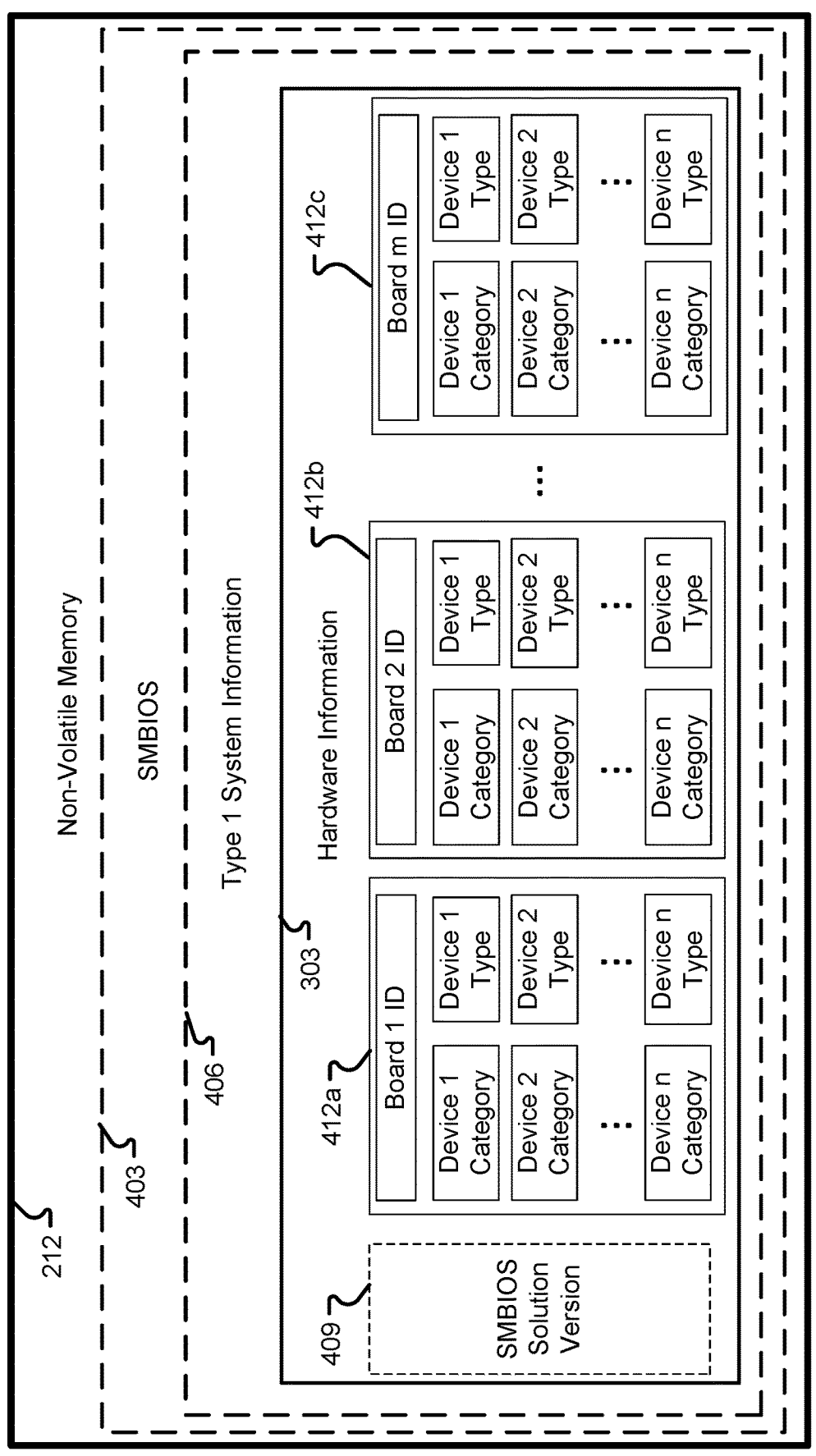
FIG. 4 is a block diagram illustrating non-volatile memory of a computing system including hardware information in accordance with at least some embodiments of the present disclosure.

As illustrated in FIG. 4, in some implementations, an SMBIOS 403 may be used to provide the hardware information 303 to the boot loading application 324 during the boot-up process. For example, during the system boot-up, firmware 321 may read data fields within the SMBIOS 403. One or more fields of the SMBIOS 403, such as the Type 1 System Information field 406 as described by the SMBIOS specification produced by the Distributed Management Task Force (DMTF), may store a string containing the hardware information 303. This string may be written to the Type 1 System Information field 406 by a computing system 106 as illustrated in FIG. 1.

In some implementations, the hardware information 303 may comprise an SMBIOS solution version 409. The SMBIOS solution version 409 may be useful for manufacturers, users, and system administrators, to quickly assess a variation of the hardware components 209 within the system 103. For example, if, as illustrated in FIG. 1, a first plurality of systems 103*a* include one particular variation of hardware components 209, a second plurality of systems 103*b* include a second particular variation of hardware components 209, and a third plurality of systems 103*c* include a third particular variation of hardware components 209, each of the first plurality of systems 103*a* may include a first SMBIOS solution version 409, each of the second plurality of systems 103*b* may include a second SMBIOS solution version 409, and each of the third plurality of systems 103*c* may include a third SMBIOS solution version 409.

The hardware information 303 may also comprise one or more data sets 412*a-c*. Each data set 412*a-c* may be associated with a particular board within the system 103. Each data set 412*a-c* may comprise a board ID which may be associated with a particular PCB 206 and, for each hardware component 209 on the particular PCB 206 associated with the board ID, one or more device categories and one or more device types for each device category.

For example, a system 103 may include three PCBs 206. A first PCB 206 may be a fan controller board and may include hardware components 209 of a fan controller and a thermal sensor. A second PCB 206 may be an ASIC board and may include hardware components 209 of a number of voltage regulators and thermal sensors. A third PCB 206 may be a clock board and may include hardware components 209 of a number of voltage regulators and clocks.

Continuing the example, in the system 103 may be stored hardware information 303 which may comprise three data sets 412*a-c*. The first data set 412*a* may be associated with the first PCB 206, the second data set 412*b* may be associated with the second PCB 206, and the third data set 412*c* may be associated with the third PCB 206.

The first data set 412*a* may store a board ID identifying the PCB 206 as a fan controller board, a category and a type for the fan controller, and a category and a type for the thermal sensor.

The second data set 412*b* may store a board ID identifying the PCB 206 as an ASIC board and a category and a type for the each of the voltage regulators and each of the thermal sensors.

The third data set 412*c* may store a board ID identifying the PCB 206 as a clock board, and a category and a type for each of the voltage regulators and the clocks.

The board ID may be a code (or board code) which may refer to a type of PCB 206 within the system 103. For example, there may be a plurality of PCBs 206 within a switch system 103, including a CPU or Comex board, a switch or ASIC board, a power board, a fan board, a platform board, a clock board, and other types of PCBs. There may also be a plurality of hardware components 209 on each PCB 206. Each PCB 206 may be referred to by a code. A code may be an alphanumerical representation of the purpose of the PCB 206. For example, a CPU or Comex board may be referred to by a board code of C, a switch or ASIC board may be referred to by a board code of S, a power board may be referred to by a board code of P, a fan board may be referred to by a board code of F, a platform board may be referred to by a board code of L, a clock board may be referred to by a board code of K, and other types of PCBs may be referred to by other board codes. The example board codes provided herein are for example purposes only and should not be considered as limiting board codes to being single characters or letters.

By using a board ID, different configurations of systems 103*a-c* may easily be compared. System administrators comparing two devices 103*a-c* can quickly ascertain whether differences between the two system 103*a-c* lie in the particular system 103*a-c*. For example, two systems 103*a-c* may comprise identical CPU, switch, power, and fan boards, but different clock boards. By reading the hardware information 303, a system administrator can quickly see what type of clock board is in each system.

Also, during boot, a system 103, through a method 600 as described below, can automatically determine which hardware component 209 is on which particular PCB 206 when determining which driver 312*a-c* to load.

For each hardware component 209, a device category code may be assigned. Hardware components 209 of the same category, such as thermal sensors, voltage regulators, etc., may be assigned a common category code. For example, thermal sensors may be assigned a category code of T and voltage regulators may be assigned a category code of R.

By using a common category code for hardware components 209 of a same category, system administrators can quickly ascertain differences between two systems 103*a-c* by seeing how many and what category of devices are installed on each PCB 206 within the systems 103*a-c*. For example, a system administrator can see that a clock board of a first system 103*a* includes two voltage regulators and one thermal sensor, while a clock board of a second system 103*b* includes three voltage regulators and two thermal sensors, even if the exact voltage regulator and/or thermal sensor being used in each system 103*a-b* differs.

For each hardware component 209, a device code may be assigned. Because different devices of a same category may require different drivers, it may be necessary for a boot loading application 324 to distinguish between different devices of a same category. For example, a first system 103*a* including a first thermal sensor and a second system 103*b* including a second thermal sensor may require the loading of different device drivers 312*a-c*. To enable the boot loading application 324 to determine which specific type of device of each device category is installed within the system 103, each device type may be assigned a different code. In some implementations, device codes may be a single character, such as a letter. For example, a thermal sensor of device type lm75 may be assigned a category code of T (for thermal sensor) and a device code of a, while a thermal sensor of device type tmp102 may be assigned a category code of T and a device code of b.

It should also be appreciated that device codes may be assigned to drivers instead of or in addition to the types of device. That is, each hardware component 209 installed in a system 103 may be referred to by the driver 312 which must be loaded for the hardware component 209 to be loaded. For example, a voltage regulator with a part number of FJ2490 manufactured by Company Z and a voltage regulator with a part number of EO3954 manufactured by Company A may each require the same driver. As a result, in some implementations, each may be assigned the same device category code and device code (e.g., Ra), while in other implementations, each may be assigned different device category codes and device codes (e.g., Rb and Rc).

For each system 103 being produced, the board ID of each PCB 206, device category and type of each hardware component 209, and in some implementations an SMBIOS solution version, may be combined into a string or other format of data. This string or other format of data may be referred to as hardware information 303. The hardware information 303 may indicate, for each PCB 206, all of the components which require drivers 312 to be loaded.

In some implementations, the board ID for each PCB 206 may be followed by a list of all the device category and type combinations for each hardware component 209 on the respective PCB 206. For example, consider a system 103 containing one CPU PCB 206 with a board type C, one switch PCB 206 with a board type S, and one fan PCB 206 with a board type F. A voltage regulator with a device category R and a type a and an analog-to-digital converter with a device category A and a type x may be mounted on the CPU PCB. Another voltage regulator with a device category R and a type a and a thermal sensor with a device category T and a type b may be mounted on the switch PCB. A different type of thermal sensor, with a device category T and a type a may be mounted on the fan PCB. As a result, the hardware information 303 may be a string as follows: CRaAx-SRaTb-FTa.

In some implementations, board IDs may be followed by a board count or board number. For example, a system may contain two CPU PCBs, each containing the same hardware components. The CPU PCB portion of the hardware information may contain a C2 followed by the device category and type for each device on each CPU PCB. In some implementations, a number following a board ID may represent a PCB number instead of a number of PCBs. For example, a system may contain two CPU PCBs, each containing the same or different hardware components. The first CPU PCB may be represented with a one following a board ID of C and the second CPU PCB may be represented by a two following a board ID of C.

In some implementations, hardware components 209 or PCBs which are not installed within a system 103 may also be represented in the hardware information 303. For example, one or more PCBs or hardware components on a particular PCB may be optional. Systems 103 which do not contain the optional hardware components may have hardware information 303 which indicates the components are not installed. Representing that a particular hardware component is not installed in the system 103 may be accomplished by listing a zero as its type, e.g., R0, T0, or A0. Similarly, representing that a particular PCB is not installed in the system 103 may be accomplished by listing a zero after the board ID, e.g., C0, S0, or F0.

In some implementations, a wildcard, such as an asterisk (*) may be used in the hardware information 303 to indicate where a particular PCB or hardware component may be used in the future, such as for a board count or a board number. Alternatively, in some implementations, a wildcard may be used in the case that the system includes multiple PCBs of a same type, each of which including the same hardware components.

The SMBIOS solution version may be an alphanumerical code which may be used to refer to different versions of systems 103*a-c*. For example, as production on systems 103*a-c* requires different versions of systems 103*a-c*, while the PCBs and/or the hardware components may change, changing the hardware information 303, a different version number or SMBIOS solution version ID may be included so that system designers can quickly and easily refer to different versions or ascertain the version of a particular system 103.

The hardware information 303 may be stored in SMBIOS 403 within non-volatile memory 212 of a system 103, such as in the Type 1 System Information field 406 alongside other information such as manufacturer, product name, serial number, UUID, SKU number, family, etc. In such an implementation, the hardware information may be an alphanumerical string. It should be appreciated though that the hardware information 303 may be stored elsewhere within the non-volatile memory 212 such as in the form of a text file.

By reading the hardware information 303, a processor 203, performing a boot of the system 103, may be capable of determining not only which hardware components 209 are or are not installed within the system 103, but also on which PCB 206 each hardware component 209 is installed.

As described below, the processor 203, when performing the boot of the system 103, may compare the contents of the hardware information 303 with the lookup table 306 to identify one or more drivers 312*a-c* in the driver package 309 which should be loaded based on the hardware components 209 in the system 103.

Figure 5:
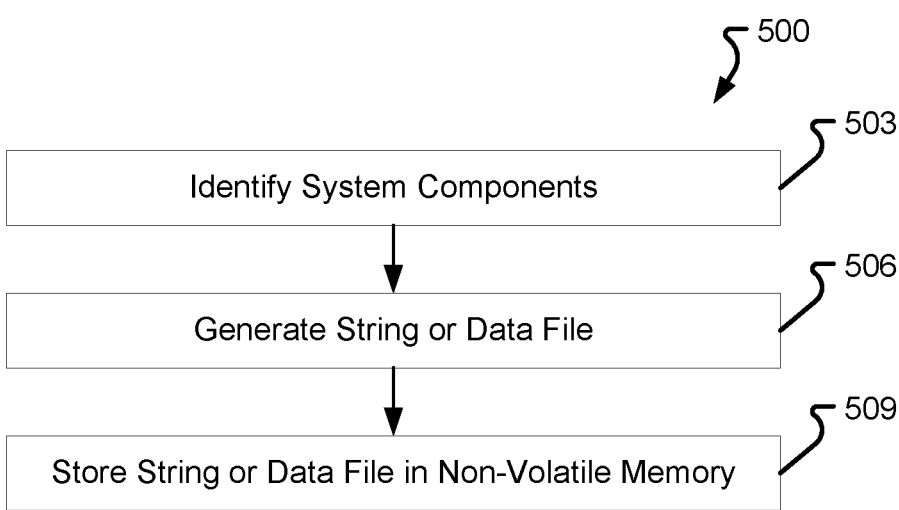
FIG. 5 is a flow diagram illustrating a method of generating and storing a string or data file in accordance with at least some embodiments of the present disclosure.
Figure 6:
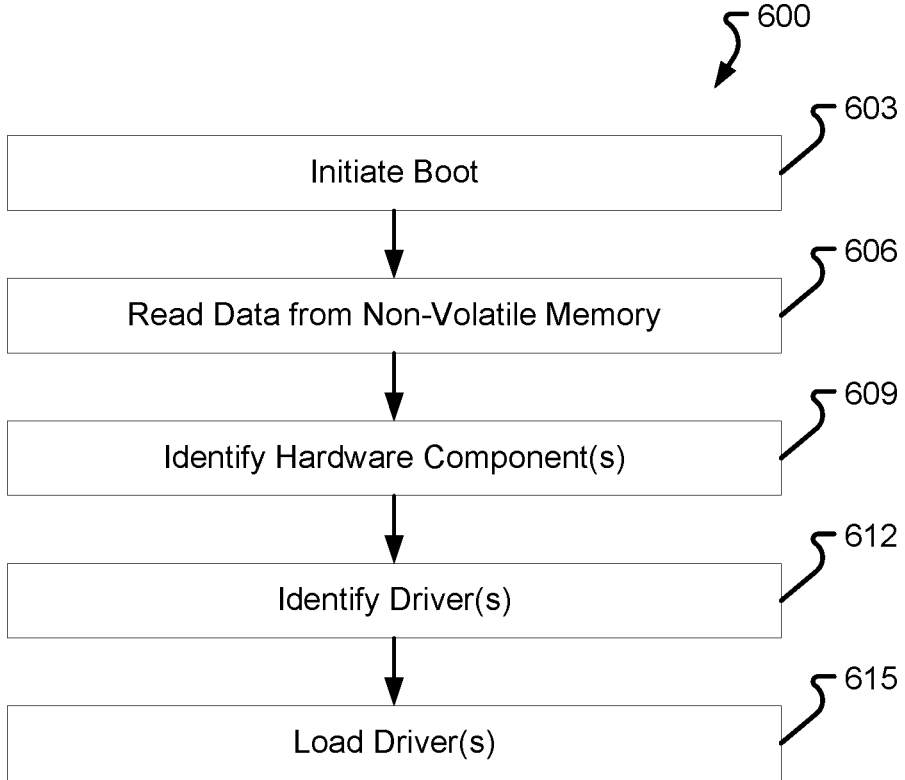
FIG. 6 is a flow diagram illustrating a method of loading drivers in accordance with at least some embodiments of the present disclosure.

Referring now to FIGS. 5 and 6, additional details regarding operations of components in the systems 103, 106 will be described. While certain steps of the methods 500, 600 will be described as being performed in a particular order and by a particular component, it should be appreciated that embodiments of the present disclosure are not so limited. Specifically, the order of operations in the various methods may be modified and any component or combination of components in the system 103, 106 may be configured to perform some or all of the method steps depicted and described herein.

As illustrated in FIG. 5, a method 500 of creating hardware information 303 for a system 103*a-c* being produced may be performed by a computing system 106 as illustrated in FIG. 1. As described above, during production of a particular system 103*a-c*, such as a switch, a number of factors, such as component shortages or price changes, may result in the hardware components 209 and/or PCBs 206 within the system 103*a-c* being produced to be changed between systems 103*a-c*. As a result of the method 500, each system 103*a-c* may be provided, in non-volatile memory 212, hardware information 303 which may be used by a boot loading application 324 to load the necessary drivers 312*a-c* based on the actual hardware components 209 and/or PCBs 206 within the particular system 103*a-c*.

The method 500 may begin at 503, in which the computing system 106 may automatically identify a plurality of hardware components installed on one or more PCBs of a system 103. The computing system 106 may also identify the PCBs within the system and determine on which PCB each hardware component is installed.

The computing system 106 performing the method 500 may be operated by or in communication with a user such as a hardware or production designer. For example, a user may interact with the computing system 106 to enable the system 106 to identify the hardware components installed in each system 103 being produced. In some implementations, identifying the hardware components may comprise processing a RefDes list. For example, the computing system 106 may receive or access a RefDes list indicating all the hardware components and/or PCBs within a particular system 103. From the RefDes list, the computing system 106 may identify each hardware component by determining a RefDes for each component, determining a device category, determining a device type, and determining a board on which the component is installed. It should be appreciated that the identifying of the components may take place before the board is manufactured. That is, the computing system 106 may determine the hardware components which will be in a system 103 before the components are installed on the board(s) within the system 103.

At 506, based on the identified hardware components installed in the system 103, the computing system 106 may automatically generate hardware information 303 in the form of a string, or data or another format, comprising one or more characters, such as an alphanumerical code, for each of the plurality of hardware components.

As described above, each component may be assigned a category code and a device code. In some implementations, it may not be necessary to list hardware components which do not require a driver to be loaded during the initial boot of the system 103 in the hardware information 303. In such an implementation, such hardware components may be omitted from the hardware information 303. As such, the elements represented in the string may each be associated with a particular driver or configuration setting which must be acted upon by software to initialize the system.

In some implementations, automatically generating the string may comprise converting each entry of a RefDes list to a category code and a device code. For example, the computing system 106 may process the list of hardware components and convert each entry to a category code and a device code based on the listed hardware components. Converting RefDes entries to category and device codes may in some implementations involve comparing the RefDes entries to a lookup table which may associate RefDes entries with category and device codes. If a hardware component is not listed in the lookup table, the system 106 may be enabled to automatically create a new category and/or device code for a new hardware component. Newly created category and/or device codes may be shared with other computing systems 106, such as via a network 109, to keep the usage consistent throughout production of different types of systems.

In some embodiments, if a particular component in the design is removed, such as if a hardware component is unnecessary or optional, the removal of that component may be represented in the string by a category code and a device code. For example, a category code may indicate the category of the component which was removed, and the device code may be a zero to indicate the component is not installed. As a result, for each variation of computing system, the strings may be a common format. This enables users to quickly ascertain the differences in components between each variation.

Generating hardware information 303 in the form of a string may comprise first writing a version number followed by a hyphen followed by a first board ID representing a first PCB. The first board ID may be followed by a category code and a device type code for each hardware component on the first PCB. After the category code and device type code for the last hardware component of the first PCB, a hyphen may be inserted, followed by a second board ID representing a second PCB, followed by the category code and device type code for each hardware component on the second PCB. As an example, a string may comprise: V1-C*RaTeTeTe-F1Rb-F2Rc, where V1 represents the version, C* represents any of one or more CPU boards within the system, Ra represents that there is one voltage regulator of type 'a' on each of the one or more CPU boards, and each Te represents a thermal sensor of type 'e' on each of the one or more CPU boards, where the three Tes represent there being three thermal sensors of type 'e' on each of the one or more CPU boards. F1 represents a first fan board and F2 represents a second fan board. The Rb following F1 represents the first fan board including a voltage regulator of type 'b', while the Rc following F2 represents the second fan board including a voltage regulator of type 'c'.

At 509, the computing system 106, after generating the hardware information 303, may store the hardware information 303 as a string or data file in non-volatile memory 212 of the computing system 103. Storing the hardware information 303 may comprise populating an SMBIOS field with the string or writing the contents of the string or data file to a table in the non-volatile memory 212. The non-volatile memory 212 of the computing system 103 may be, for example, an EEPROM, flash memory, NVRAM, or other type of memory device. The hardware information 303 may be stored in any memory location available to the boot loading application 324 during the boot sequence of an initial boot of the system 103.

In some implementations, the method 500 may also comprise providing a lookup table 306 for in the non-volatile memory 212 of the system 103. For example, the computing system 106 may store a lookup table 306 in the non-volatile memory of the system 103. A lookup table 306 may include a list of all possible hardware components and may list a category and type code for each, along with an indication as to the driver or drivers 312*a-c* which should be loaded if the hardware component is included in the system 103. Using the table, software of the system may be enabled to look up a component by the component and device code and determine what driver or configuration setting is needed.

For example, hardware designers, when planning the system, may plan ahead to identify any potential hardware component types which might be mounted to the board as alternative design choices. Each potential hardware component may be assigned a category and device code. In this way, the software of the system may be capable of determining what drivers need to be installed or what configuration changes should be made based on the category and device codes in the string.

As illustrated in FIG. 6, a method 600 of performing a boot of a system 103 may be performed. The method 600 may be performed by a system 103, such as a switch, which was provided hardware information 303 in non-volatile memory 212 such as through a process as described above in relation to FIG. 5.

Upon being initially powered-on, the system 103 may begin operation by initiating a boot sequence at 603. In the first stages of the boot sequence, the firmware 321 of the system 103, such as UEFI or BIOS, may initialize the hardware and locate the boot loading application 324. The functions of the boot loading application may be performed by a hardware management process such as a board support package (BSP) and may be executed by a processor 203.

At 606, the boot loading application 324 may read the hardware information 303. For example, the boot loading application 324 may read, from a memory device, a string in an SMBIOS field or a data file.

By reading the hardware information 303, the boot loading application 324 may access the string or data file containing the list of board IDs, and device categories and types. Next, the boot loading application 324 may parse the hardware information 303 to ascertain which hardware components 209 and/or PCBs 206 are installed within the system 103.

At 609, based on the hardware information 303, the boot loading application 324 may identify the hardware components 209 and/or PCBs 206 for which drivers 312 should be loaded and at 612, the boot loading application 324 may identify, based on the alphanumerical category and type code for each of the hardware components, one or more kernel drivers associated with the hardware components In some implementations, identifying the drivers associated with the hardware components 209 may comprise comparing the category and type codes with entries in a lookup table 306. The boot loading application 324 may map the category and type codes with the entries in the lookup table to find a driver ID 315a-c or to otherwise identify one or more drivers 312a-c which should be loaded based on the hardware components 209 in the system 103.

At 615, the boot loading application 324 may load the drivers. For example, after identifying the necessary drivers 312a-c, the boot loading application 324 may locate the drivers 312a-c in memory. The specific location of these drivers can vary, but the drivers may be stored in a dedicated area of the non-volatile memory 212, such as bundled in a driver package 309. The drivers may be stored on a memory device, such as an SSD. As should be appreciated, the drivers may be kernel drivers or other types of drivers which should be loaded during the initial boot of the system 103.

Upon identifying the necessary drivers and their locations in memory, the boot loading application 324 may proceed to load the drivers 312a-c into memory, such as into a dedicated area of system RAM or other volatile memory 215. This process may involve reading the driver executable data 318a-c from its storage location in non-volatile memory 212 and writing it to the appropriate place in system memory, where it can be executed as needed.

Once all the necessary drivers have been loaded, the boot loading application 324 and/or the firmware 321 may complete remaining steps of the boot sequence, such as starting system services, loading a user interface, and preparing the system to run user applications. Upon completion of the boot sequence, the system 103 may be fully operational, with all necessary drivers 312a-c loaded and ready to interact with the system's hardware components 209 as needed to support software operations.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

The present disclosure encompasses methods with fewer than all of the steps identified in FIGS. 5 and 6 (and the corresponding description of the methods), as well as methods that include additional steps beyond those identified in FIGS. 5 and 6 (and the corresponding descriptions of the methods). The present disclosure also encompasses methods that comprise one or more steps from the methods described herein, and one or more steps from any other method described herein.

Embodiments of the present disclosure include a system comprising one or more circuits to: initiate a system initiation or a boot of the system; during the system initiation or the boot of the system, read data from a non-volatile memory; based on the data from the non-volatile memory, identify a plurality of hardware components; identify one or more drivers based on the plurality of hardware components; and load the one or more drivers during the system initiation or the boot of the system.

Aspects of the above systems and method may include any one or one or more of wherein the data is a string, wherein the data is stored in an SMBIOS field, wherein the data is a file, wherein the non-volatile memory is an electrically erasable programmable read-only memory (EE-PROM) device, wherein the data is written to the non-volatile memory prior to the system initiation or the boot of the system, wherein the data is written to the non-volatile memory during production of the system, wherein reading the data and identifying the one or more drivers is performed by a software application during the system initiation or the boot of the system, wherein identifying the one or more drivers comprises selecting the one or more drivers from a memory storage device, wherein the one or more drivers are kernel drivers, wherein the one or more circuits are further to determine, based on the data, a printed circuit board (PCB) from among a plurality of PCBs on which each hardware component of the plurality of hardware components is mounted, wherein each of the plurality of PCBs comprise one of an application-specific integrated circuit (ASIC) board, a central processing unit (CPU) board, a clock board, a fan board, a platform board, a power board, and a switch board, wherein the plurality of hardware components comprises one or more of a thermal sensor, temperature sensor, voltage sensor, a voltage regulator, a memory storage device, an input/output device, a timer, and a fan, wherein the hardware components of the plurality of hardware components are not hot-pluggable, wherein the data comprises one or more characters indicating hardware components not installed in the system, and/or wherein identifying the plurality of hardware components comprises comparing characters in the data to entries of a lookup table.

While illustrative embodiments of the disclosure have been described in detail herein, it is to be understood that the inventive concepts may be otherwise variously embodied and employed, and that the appended claims are intended to be construed to include such variations, except as limited by any prior art.

What is claimed is:

1. A system comprising one or more circuits to:
   initiate a system initiation or a boot of the system;
   during the system initiation or the boot of the system, read a string from a non-volatile memory;
   identify, based on the string read from the non-volatile memory during the system initiation or the boot of the system, one or more board IDs and a plurality of device categories associated with a plurality of hardware components, wherein the string encodes at least one board ID of the one or more board IDs for a respective device category of the plurality of device categories for each hardware component of the plurality of hardware components to enable variations in components of the system to be ascertained;
   identify one or more drivers based on the identified one or more board IDs and plurality of device categories associated with the plurality of hardware components; and
   in response to identifying the one or more drivers, load the one or more drivers during the system initiation or the boot of the system.

2. The system of claim 1, wherein the string includes a plurality of characters, wherein one or more of the plurality of characters is associated with a hardware component of the plurality of hardware components, wherein the string represents one or more hardware components physically installed in the system.

3. The system of claim 1, wherein the string is stored in a system management basic input/output (SMBIOS) field.

4. The system of claim 1, wherein the string is stored in a file.

5. The system of claim 1, wherein the non-volatile memory is an electrically erasable programmable read-only memory (EEPROM) device.

6. The system of claim 1, wherein the string is written to the non-volatile memory prior to the system initiation or the boot of the system.

7. The system of claim 1, wherein the string is written to the non-volatile memory during production of the system.

8. The system of claim 1, wherein reading the string and identifying the one or more drivers is performed by a software application during the system initiation or the boot of the system.

9. The system of claim 1, wherein identifying the one or more drivers comprises selecting the one or more drivers from a memory storage device, wherein the one or more drivers are kernel drivers, wherein the memory storage device includes a plurality of drivers and the selected one or more drivers are a subset of the plurality of drivers.

10. The system of claim 9, wherein the one or more circuits are further to determine, based on the string, a printed circuit board (PCB) from among a plurality of PCBs on which each hardware component of the plurality of hardware components is mounted.

11. The system of claim 10, wherein the plurality of PCBs comprise at least one of an application-specific integrated circuit (ASIC) board, a central processing unit (CPU) board, a clock board, a fan board, a platform board, a power board, and a switch board.

12. The system of claim 1, wherein the plurality of hardware components comprise one or more of a thermal sensor, temperature sensor, voltage sensor, a voltage regulator, a memory storage device, an input/output device, a timer, and a fan.

13. The system of claim 1, wherein each of the hardware components of the plurality of hardware components are not hot-pluggable.

14. The system of claim 1, wherein the string comprises one or more characters indicating hardware components not installed in the system.

15. The system of claim 1, wherein identifying the plurality of hardware components comprises comparing characters in the string to entries of a lookup table.

16. A switch system comprising one or more circuits to:
initiate a system initiation or a boot of the switch system;
during the system initiation or the boot of the switch system, read a string from a non-volatile memory;
identify, based on the string read from the non-volatile memory during the system initiation or the boot of the system, one or more board IDs and a plurality of device categories associated with a plurality of hardware components, wherein the string encodes at least one board ID of the one or more board IDs for a respective device category of the plurality of device categories for each hardware component of the plurality of hardware components to enable variations in components of the system to be ascertained;
identify one or more drivers based on the identified one or more board IDs and plurality of device categories associated with the plurality of hardware components; and
in response to identifying the one or more drivers, load the one or more drivers during the system initiation or boot of the switch system.

17. The switch system of claim 16, wherein the string includes a plurality of characters, wherein one or more of the plurality of characters is associated with a hardware component, wherein the string represents one or more hardware components physically installed in the system.

18. The switch system of claim 16, wherein the string is stored in a system management basic input/output (SM-BIOS) field.

19. The switch system of claim 16, wherein the string is stored in a file.

20. A method of initializing a system, the method comprising:
initiating a system initiation or a boot of the system;
reading a string from a non-volatile memory during the system initiation or the boot of the system;
identifying, based on the string read from the non-volatile memory during the system initiation or the boot of the system, one or more board IDs and plurality of device categories associated with a plurality of hardware components, wherein the string encodes at least one board ID of the one or more board IDs for a respective device category of the plurality of device categories for each hardware component of the plurality of hardware components to enable variations in components of the system to be ascertained;
identifying one or more drivers based on the identified one or more board IDs and plurality of device categories associated with the plurality of hardware components; and
in response to identifying the one or more drivers, loading the one or more drivers during the system initiation or the boot of the system.

* * * * *